No. 622,562. Patented Apr. 4, 1899.
J. G. SUTTON.
SIPHON FILTER.
(Application filed Dec. 6, 1898.)
(No Model.)
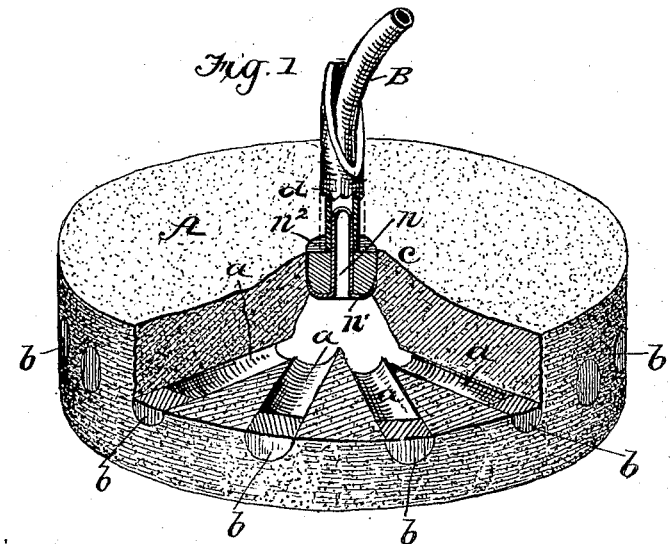
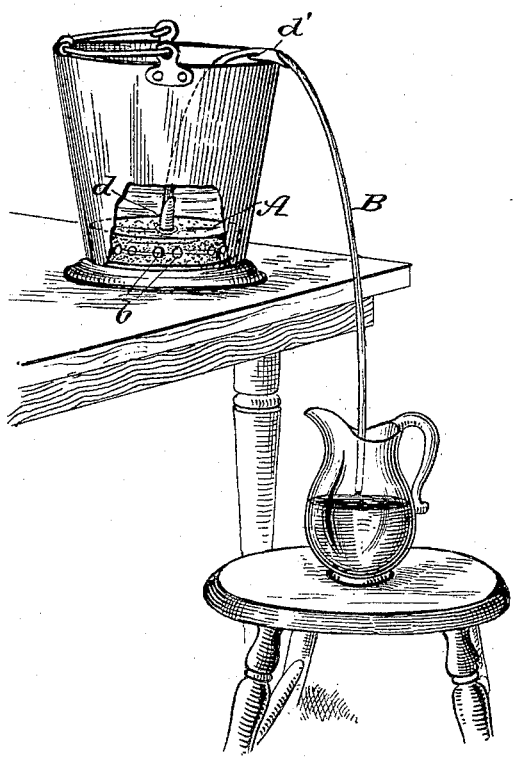
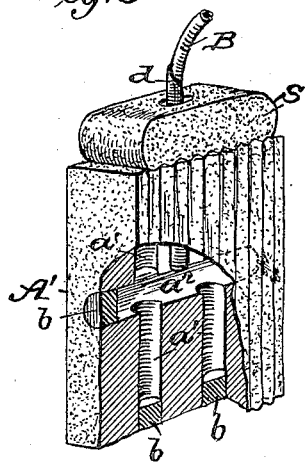
WITNESSES:
Jos. A. Ryan
Edw. W. Byrn
INVENTOR
Joseph G. Sutton.
BY Munn & Co.
ATTORNEYS.

UNITED STATES PATENT OFFICE.

JOSEPH G. SUTTON, OF SENECA, MISSOURI.

SIPHON-FILTER.

SPECIFICATION forming part of Letters Patent No. 622,562, dated April 4, 1899.

Application filed December 6, 1898. Serial No. 698,465. (No model.)

*To all whom it may concern:*

Be it known that I, JOSEPH G. SUTTON, of Seneca, in the county of Newton and State of Missouri, have invented a new and useful Improvement in Siphon-Filters, of which the following is a specification.

My invention relates to that form of filter in which a porous filtering-block is provided with internal chambers communicating with an outlet-tube, which block when immersed in the water becomes saturated with the water by capillary absorption until the central chambers are filled, and the discharge-tube from which is allowed to depend to a lower level to form the long leg of a siphon, the water within which, descending from gravity, creates a pull or suction within the porous block that causes a continuous filtration of water therethrough.

My invention consists in a filtering-block formed of porous material, preferably a natural stone known as "Missouri tripoli," which block has intersecting passage-ways bored into it, the outer ends of said passage-ways being closed by a plug of cement and the discharge ends of the passage-ways being all in communication with a specially-constructed outlet-tube tightly cemented into the block, as hereinafter fully described.

Figure 1 is a perspective view of my filtering device partly broken away. Fig. 2 shows its application when in use and acting as a siphon. Fig. 3 shows a modified form of the filter-block.

In the drawings, A represents the filtering-block. This may be either a short cylinder, as shown in Fig. 1, or of cubical shape, as shown at A' in Fig. 3. In either case the block is made of a sawed section of Missouri tripoli stone, which is a very porous stone and a fine natural filter. In these blocks are formed passage-ways $a$ by boring with a boring-tool from the outside inwardly to form numerous or any desired number of chambers. These in Fig. 1 are arranged radially and intersect each other by their convergence toward the center, while in Fig. 3 longitudinal borings $a'$ are intersected by one or more transverse borings $a^2$. In all cases after the passage-ways are bored their outer ends are tightly plugged up, as shown at $b$, by cement or luting of any water-resisting composition. The passage-ways are all in communication with an outlet-boring $c$, in which is tightly cemented a connection for a discharge-tube B, preferably of soft rubber. In connecting the discharge-tube to the filtering-block a metallic nipple $n$ is employed. This nipple has a flanged head $n'$, preferably star-shaped or made with scalloped edges. The stone is bored with an opening large enough to receive the head $n'$, and after the latter is in place an annular filling of cement $n^2$ is poured around the same, which tightly closes the space around the discharge-nipple and firmly anchors the nipple to the stone. At the point where this rubber tube connects with the filtering-block it is surrounded by a larger reinforcing-sleeve $d$, of soft rubber, whose upper end is cut away to a bevel. This sleeve prevents the rubber tube from bending too abruptly and breaking at the point of connection. A similar reinforce-sleeve of rubber $d'$ is arranged to slide along the rubber tube to form a bearing on the rim of the vessel, from which the tube extends as a siphon to prevent the tube from collapsing from too sharp a bend. This sleeve $d'$ is beveled at both ends.

Now when the block A is immersed in a vessel of water, as shown at Fig. 2, and the long rubber tube is allowed to depend over the side to the lower receptacle to receive the filtered water it will be seen that the tube forms a siphon and when filled with water the weight of the water in the long leg of the siphon will create a suction within the filtering-block that causes the extraneous water to continually pass through the stone to the passage-ways within, leaving the impurities upon the external surfaces of the stone, while the clear water passes out of the siphon to the subjacent receptacle in a continuous manner. This filter not only takes out the mechanical impurities in the shape of particles of foreign matter held in suspension, but is practically a germ-proof filter. For cleansing the same all that is necessary is to wash and scour the exterior surface of the block to which the impurities adhere. To increase the exterior filtering-surface of the blocks, they may be corrugated, as shown in Fig. 3. To facilitate the scouring of the filter, I provide a scouring-block S, formed of a block of tripoli stone and having one side smooth and the other corrugated to fit the corrugations in the side of the filtering-block. To permit the compact packing of the scouring-block along with the filtering-block and to hold the rubber tube erect without bending where it emerges from the filtering-block, said scouring-block is formed with a hole through it to receive the rubber tube, as seen in Fig. 3. This scouring-block of tripoli quickly cuts off all adhering impurities on the filtering-block when rubbed over its surface, and restores its filtering qualities.

I am aware that it is not new to construct a filtering-block of tripoli stone and form filtering-tubes of it and to use in connection therewith a siphon-tube, and I do not claim this broadly.

My invention is distinctive in the formation of round-bored passage-ways whose outer ends are filled with cement and whose inner ends intersect and are provided with a single outlet-tube of the kind described, directly connected to the block without any external metal head or plate. This not only makes a very much cheaper filter, but it reduces the chances of leakage at the outlet, as there is no plate with rubber gasket. It also increases the filtering-surface, and the block being solid with round borings alternating with solid webs of arch shape in cross-section it makes the more or less fragile tripoli far less liable to break in handling and cleaning than thin shells of tubular form made of the same.

Having thus described my invention, what I claim as new, and desire to secure by Letters Patent, is—

1. A filtering-block of a porous material having bored passage-ways intersecting at a point within the block, and having their outer ends plugged up, and a single outlet or discharge tube consisting of a nipple $n$ with inner head $n'$ and a cement filling $n^2$ connecting it directly to the block and in communication with the internal passage-ways substantially as and for the purpose described.

2. A circular filtering-block of porous material having bored passage-ways arranged to converge and intersect toward the center, and having their outer ends plugged up, and having a single outlet or discharge tube cemented directly to the block and communicating with the inner ends of the passage-ways substantially as and for the purpose described.

3. The combination with a filtering-block, and its outlet-tube; of a scouring-block having a hole through it and embracing the tube at its point of connection with the filtering-block, to facilitate compact storage, and to prevent the sharp bending and cracking of the tube substantially as shown and described.

4. The combination with the flexible siphon-tube in a filter; of a reinforcing-sleeve made of soft-rubber tubing having its ends cut tapered and embracing the siphon-tube substantially as shown and described.

JOSEPH G. SUTTON.

Witnesses:
MATT. C. MURDOCK,
J. G. McGANNON.